United States Patent Office 2,868,650
Patented Jan. 13, 1959

2,868,650
PROCESS FOR THE PREPARATION OF A ROLLED MEAT PRODUCT

Chester A. Hammerberg, Des Plaines, Ill., assignor to Armour and Company, Chicago, Ill., a corporation of Illinois No Drawing. Application April 23, 1956
Serial No. 579,762

2 Claims. (Cl. 99—107)

This invention relates to a rolled meat product and to a process for its preparation.

Commercially prepared rolled meat products have already achieved a great deal of popularity. They provide a dual advantage for the consumer since they are conveniently and quickly prepared for serving, and contain none of the waste material, such as bones and excess fat, commonly associated with ordinary cuts of meat. The rolled meat product is also popular with meat packers as it eliminates the shipping of waste materials.

The one significant disadvantage of the rolled meat product has been the tendency of the roll to fall apart. Heretofore it has been essential to bind the roll with cord at uniformly spaced distances along the length of the roll. This cord is not edible and must be removed from the food by the consumer after the meat roll is cooked.

Accordingly, it is an object of this invention to provide a meat product with all the economy and convenience of the meat roll. It is the specific object to provide a process which eliminates the necessity for the cord binding around the meat roll. Other objects and advantages of the invention will appear as the specification proceeds.

Many rolled meat products, for example, veal, beef, pork, mutton, etc., may be made according to the process of this invention. Of these the veal roll has been found to be the most popular with the retail trade.

In the preliminary steps of the process, the bones and excess fat are removed from the meat. All extraneous material, such as heavy sinews, blood clots, and glands, may also be removed at this stage of the process.

After such preliminary processing, the meat pieces are passed through a machine in which all the surfaces of the meat are roughened by a multiplicity of slits or cuts. The great number of serrations, cuts and slits in the surface of the meat create at the surface of the meat a mass of jagged projecting fingers formed of meat. Interjacent to these projecting fingers of meat are formed a number of interstices which later in the process become useful in causing the meat pieces to cohere. Meat juices may also be exuded at an increased rate from the greatly increased exposed surface area of the meat.

The roughened meat is then rolled, suitably by hand, into the desired shape and size. A roll of from 4 to 5 inches in diameter and 10 to 12 inches in length has been found to be very satisfactory.

The rolled meat is next mechanically molded under pressure. In the pressing operation the jagged projecting fingers at the surface of each piece of meat interpenetrate the interstices of the surface of the adjoining piece of meat, thereby effecting the union of the contiguous intermeshed meat surfaces. Hence in this operation the meat roll becomes, for all practical purposes, a single integrated cylinder of meat. This meat roll is form-retaining, self-sustaining and is devoid of waste material. A firm, uniform and completely round roll is produced.

In the ordinary procedure after the pressing step, it has been necessary to bind the roll with a cord at uniform distances along its length. The step of making multiple cuts and slits in the face of the meat prior to the rolling eliminates the necessity for the cord binding.

In order to prevent desiccation, shrinkage and loss of meat juices the meat roll is coated with fat. We prefer to either dip the roll in melted oleomargine or wrap the roll in one or more layers of caul fat. Dipping in oleomargarine serves also to improve the color of the product. Either dipping in oleomargarine or wrapping in caul fat will also serve to promote uniform basting when the product is cooked. The fat coating generally serves also to make a tastier product.

The finished meat roll is then wrapped in a freezer proof paper. Such wrapping aids in preventing desiccation and freezer burn. The product is usually then quick frozen and is generally sold in the frozen state.

While in the foregoing specification the invention has been set forth in a specific embodiment, it will be apparent to those skilled in the art that many modifications and variations may be made without departing from the spirit and scope of the invention.

I claim:

1. A process for the preparation of a rolled meat product which comprises making a multiplicity of cuts on the surfaces of meat, forming said meat in the shape of a roll and after said meat is formed in the shape of a roll, causing the contiguous surfaces of said meat to become intermeshed by the application of pressure to the external periphery of the rolled meat.

2. A process for the preparation of a rolled meat product which comprises making a multiplicity of cuts on the surfaces of meat, forming said meat in the shape of a roll and thereafter causing the contiguous surfaces of said meat to become intermeshed by the application of pressure to the external periphery of the rolled meat, wrapping said meat roll in at least one layer of caul fat, wrapping said meat roll in paper, and freezing said meat roll.

References Cited in the file of this patent

UNITED STATES PATENTS

| | | |
|---|---|---|
| 2,245,631 | Willams et al. | June 17, 1941 |
| 2,310,067 | Doering et al. | Feb. 2, 1943 |
| 2,323,953 | Williams et al. | July 13, 1943 |
| 2,721,142 | Shinn et al. | Oct. 18, 1955 |